No. 892,312. PATENTED JUNE 30, 1908.
O. SCHELLER.
SYSTEM FOR RECEIVING UNDAMPED ELECTRIC OSCILLATIONS.
APPLICATION FILED MAR. 9, 1908.
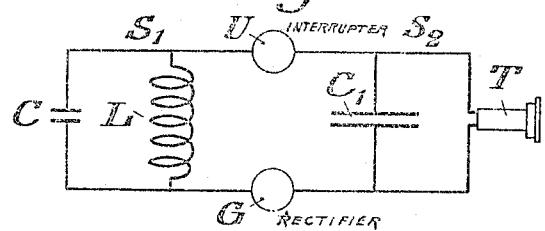
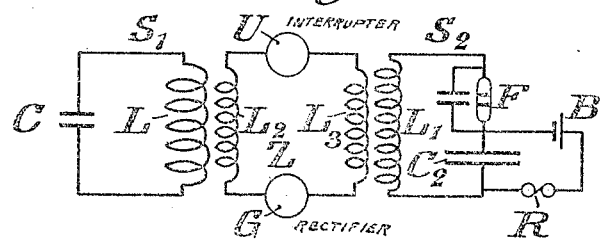

UNITED STATES PATENT OFFICE.

OTTO SCHELLER, OF STEGLITZ, NEAR BERLIN, GERMANY.

SYSTEM FOR RECEIVING UNDAMPED ELECTRIC OSCILLATIONS.

No. 892,312.     Specification of Letters Patent.     Patented June 30, 1908.

Application filed March 9, 1908. Serial No. 419,962.

*To all whom it may concern:*

Be it known that I, OTTO SCHELLER, engineer, a subject of the German Emperor, residing at 126 Albrecht-strasse, Steglitz, near Berlin, Germany, have invented certain new and useful Improvements in Systems for Receiving Undamped Electric Oscillations; and I do hereby declare the following to be a full, clear, and exact description of the invention, such as will enable others skilled in the art to which it appertains to make and use the same.

My invention relates to improvements in systems for receiving substantially undamped electric oscillations, and more particularly to that class of systems in which the energy accumulated in a high frequency-circuit is passed by impulses to a detector circuit through an interrupter.

In former systems the amount of energy delivered to the detector from the high frequency circuit, and therefore the strength of the signal or indication, has been limited to that developed in the high frequency circuit which is necessarily determined by the damping effect of the detector circuit as well as by the amplitude of the ether waves or oscillations received.

The object of my invention is to provide a system of this class in which a multiple of the said energy may be accumulated, and in which such energy as had not been spent during an oscillation of the detector circuit may be utilized with the next oscillation.

For the purpose of explaining the invention, I have shown two examples illustrating the same in the accompanying drawing, in which the same letters of references have been used to indicate corresponding parts.

In said drawing Figure 1 is a diagram of a system comprising a conductive connection included between the high frequency oscillating circuit and the detector circuit, and Fig. 2 is a similar view showing a system comprising an inductive connection in lieu of the conductive connection.

In Fig. 1 $S_1$ represents a high frequency resonant circuit comprising a capacity C and a self-induction L; $S_2$ represents a sonorous or resonant circuit comprising a capacity $C_1$ and a selfinduction T of a telephone. U is an interrupter and G a rectifier of any type.

In Fig. 2 $S_2$ represents a high frequency circuit comprising a capacity C and a self-induction L, $S_2$ is a resonant circuit containing a selfinduction $L_1$ and a capacity F of a coherer either with or without additional capacity. $C_2$ is a condenser for the source of the voltage B serving to actuate a relay R. Z is an intermediate circuit having no oscillation of its own and comprising selfinductions $L_2$ and $L_3$, an interrupter U and a rectifier G.

The operation of the systems is a follows: The self-oscillation of the circuit must be in resonance with the energy taken from the ether or transmitted to it. Therefore, the amplitude of its oscillations increases with each oscillation as long as the losses become just as large as the energy which is introduced from outside. As soon as the amplitude of the oscillations reaches a maximum, the interrupter U connects the two circuits $S_1$ and $S_2$ and allows the energy to spread upon $S_2$. By using suitable capacities and selfinductions, the distribution may be effected in such a way, that almost all the energy flows to $S_2$. Now the connection is again interrupted, both circuits resonate again with their own oscillations, and $S_1$ collects again energy. The number of the fundamental oscillations of $S_2$ must be the same as the number of the interruptions or multiples of the same. If this is the case, the circuit $S_1$ supplies energy to $S_2$ during the same phase, whereby the amplitude of the oscillations in $S_2$ also increases. A rectifier G allows the energy to pass from $S_1$ to $S_2$ only in the desired direction. For this purpose, it is advisable to employ an electrolytic cell or a valve-tube either possessing an additional voltage or not. As the fundamental oscillation of $S_2$ may be many times slower than the fundamental oscillation of $S_1$, it takes much more time for its amplitude to reach a maximum, and a multiple of the energy of $S_1$ can be accumulated therein. Besides the energy may have such form that it may be easily perceptible to the senses in a simple way, for instance by a telephone.

When the useful damping of the indicator circuit is very large it may be suitable to dispense with an accumulation of energy in this circuit; in such case the interrupter must work at so many periods as to just make the circuit $S_2$ a periodical. Should this number of periods be too high so as not to be able to produce an easily perceptible sound in the telephone, the energy, as described above, must be transferred from the high frequency circuit into a circuit having a lower frequency and from there it must be transferred a second time by another interrupter preferably coupled with the first one to another circuit which oscillates still slower.

If the ranges of frequency of the oscillations do not differ too much the rectifier may be entirely dispensed with, in which case, however, the frequency of $S_1$ must be a multiple of $S_2$. In this case, the interrupter may be replaced by a commutator, so that for each period of $S_2$ energy may be twice supplied thereto.

I claim:

1. In a system for receiving substantially undamped oscillations, the combination with a high frequency circuit, and a circuit of lower frequency, of means connecting said circuits and adapted to transmit current impulses of determined directions from the high frequency circuit to the circuit of lower frequency and working synchronously with the fundamental oscillation of the circuit of lower frequency and means permitting energy to be transmitted in one direction only.

2. In a system for receiving substantially undamped oscillations, the combination with a high frequency circuit, and a circuit of lower frequency, of an interrupter connecting said circuits and adapted to transmit current impulses of determined directions from the high frequency circuit to the circuit of lower frequency and working synchronously with the fundamental oscillation of the circuit of lower frequency, and a rectifier allowing energy to be transmitted in one direction only.

3. In a system for receiving substantially undamped oscillations, the combination with a high frequency circuit, and a circuit of lower frequency, of an interrupter connecting said circuits and adapted to transmit current impulses of determined directions from the high frequency circuit to the circuit of lower frequency and working synchronously with the fundamental oscillation of the circuit of lower frequency, and an electrolytic cell allowing energy to be transmitted in one direction only.

4. In a system for receiving substantially undamped oscillations, the combination with a resonant receiving circuit, a detector or indicating circuit, and means for conveying energy between said circuits, said means including an interrupter and a device to permit the energy to be transmitted in one direction only.

5. A receiving system for wireless telegraphy comprising a resonant receiving circuit, a resonant indicator or detector circuit associated therewith, and electrical connections between said circuits including an interrupter and a rectifier.

In testimony whereof I have affixed my signature, in presence of two witnesses.

OTTO SCHELLER.

Witnesses:
 HENRY HASPER,
 WOLDEMAR HAUPT.